Nov. 1, 1966   J. E. BRAZILL ET AL   3,282,580
REFRACTORY BOTTOM FOR OPEN HEARTH FURNACE
Filed Aug. 4, 1964

INVENTORS
Jack E. Brazill
Robert W. Lintner
Morgan Kirkpatrick

United States Patent Office 3,282,580
Patented Nov. 1, 1966

3,282,580
REFRACTORY BOTTOM FOR OPEN
HEARTH FURNACE
Jack E. Brazill and Robert W. Lintner, Johnstown, and Morgan Kirkpatrick, Conemaugh, Pa., assignors to Bethlehem Steel Company, a corporation of Pennsylvania
Filed Aug. 4, 1964, Ser. No. 387,310
4 Claims. (Cl. 263—46)

This invention relates to open-hearth furnaces and in particular to improvements in the end construction of open-hearth furnaces.

Modern day open-hearth furnaces consist of a front refractory wall, a back refractory wall, a refractory roof, a refractory lined hearth and end sections. The overall structure of the furnace is supported upon a bed of structural steel. The walls and roof are supported by a framework of structural steel.

The hearth of the furnace is a shallow elliptical refractory-lined bowl which holds the molten metal bath during refining. The furnace extends outwardly longitudinally on either side of the hearth to form the end or port sections of the furnace. The end sections of the furnace may be defined as that portion of the furnace which is included between the bridgewall and end wall and from roof to slag pit. Included in the end section of the furnace is one or more burners which supply the heat for the refining process. The passage bounded by the bridgewall, end wall, front and back wall of the furnace is generally known as an uptake. Each furnace has two uptake passages, one on either end of the furnace between the bridgewall and end wall.

The furnace is fired alternately, first one end being "on heat" and then the other end. During the "on heat" period, heated air and/or gas necessary for combustion is blown upwardly through the uptake passage to the burner. When the end section is "off heat" waste gases pass downwardly through the uptake passage to the checkers and the stack, heating the checkers for the next "on heat" period. Since the bridgewall of the furnace is between the uptake passages of the furnace and the hearth or combustion chamber, it is subjected to the heat of the incoming air and/or gas, and the outgoing hot waste gases. As a result, the refractory lining and the top brickwork of the bridgewall deteriorate rapidly, necessitating repair or replacement. If the brickwork in the bridgewall fails, the hearth at the ends of the furnace has no support. As a result, the refractory lining and brickwork of the hearth of the furnace falls into the uptake passage to the slag pockets of the furnace. The furnace must be inactivated and time spent to clean out the uptake passages, the slag pockets or pits, and to repair or replace both the brickwork in the bridgewall and the ends of the furnace hearth.

It is, therefore, the primary object of this invention to construct the end sections of an open-hearth furnace so that the hearth will remain intact even when the bridgewall is removed.

It is another object of this invention to provide a protective wall between the bridgewall of the furnace and the hearth of the furnace.

Figure 1:
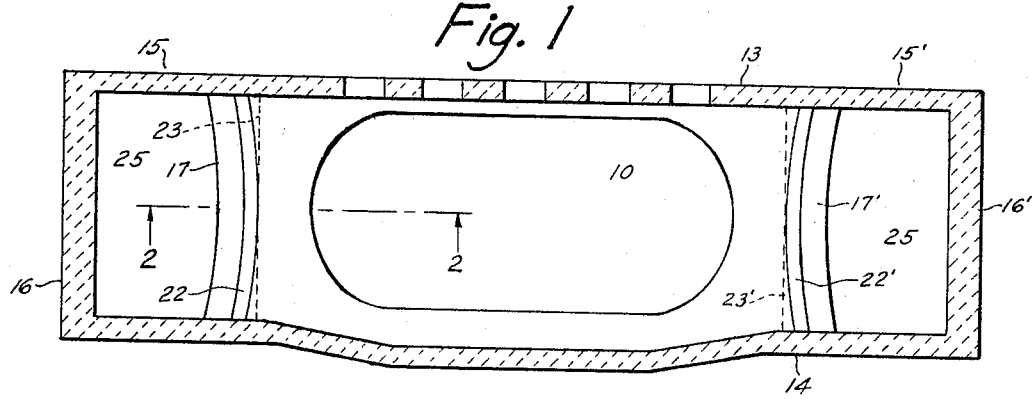
FIG. 1 is a plan view of an open-hearth furnace with the roof removed.

The open-hearth furnace of this invention is shown generally in FIG. 1 and consists of a working hearth 10, front or charging wall 13, pit or back wall 14, and end sections shown generally at 15 and 15'. Each end section of the furnace consists of an open space known as an uptake passage 25 which is bounded by the charging wall 13, end wall 16, back wall 14 and bridgewall 17 of the furnace. Directly below the uptake passage 25 is the slag pocket (not shown) of the furnace in which slag and minute solid particles carried by the waste gases of combustion accumulate. A burner is inserted into the furnace through the end wall of the furnace. Air and/or gas necessary for combustion is introduced into the furnace through the hot checkerwork (not shown) through the uptake passage 25 over the bridgewall, to the hearth.

Figure 2:
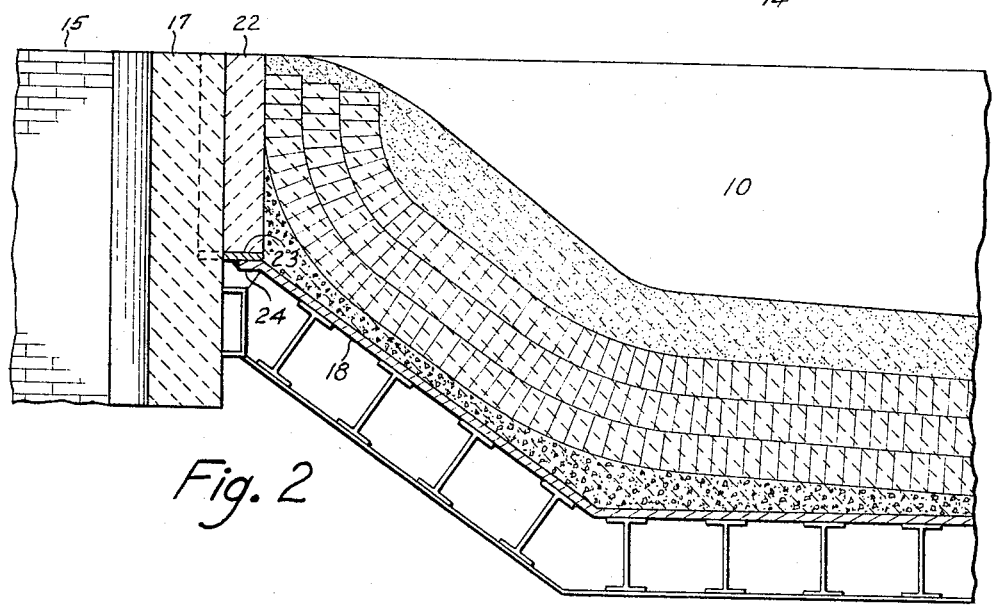
FIG. 2 is a vertical sectional view taken through line 2—2 of FIG. 1.

As shown in FIG. 2, the hearth of the furnace supported on a structural steel bed slopes upwardly to the bridgewall 17 at the end of the furnace. The vertical portion of the hearth end is supported by the bridgewall 17, which is constructed of metal-kase basic refractory brick. The hearth end exerts a force outwardly toward the ends of the furnace. It is, therefore, the primary purpose of the bridgewall 17 to resist the outward thrust of the hearth end to prevent it from falling into the uptake passage 25. A secondary, albeit an important, function of the bridgewall 17 is to separate the end section from the hearth of the furnace. Interposed between the bridgewall 17 and the end of the hearth is a metal-kase basic refractory brick wall 22. In order to support the said brick wall 22, a steel plate 23 is welded to the horizontal projections 24 of the hearth pan plate 18.

Figure 3:
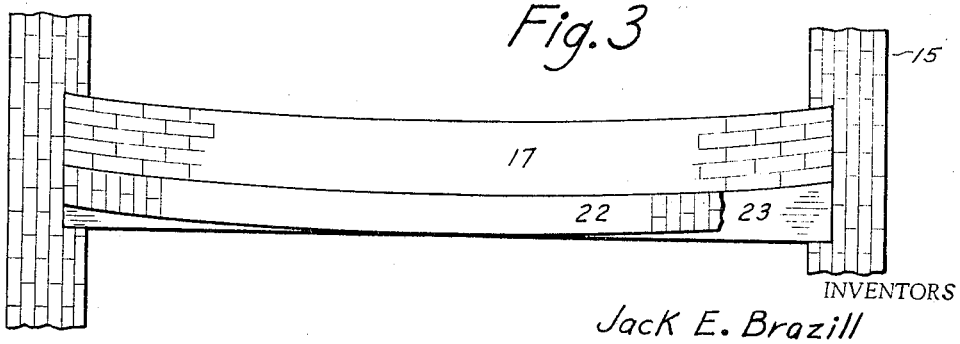
FIG. 3 is an enlarged top view of the part of the furnace embodying the invention.

Referring now to FIG. 3, the bridgewall 17 is constructed so as to be bowed inwardly toward the hearth of the furnace. This construction more readily resists the outward thrust of the vertical portion of the hearth end than would a straight wall. The steel plate 23 supporting the protective wall 22 is cut so as to fit the bowed contour of the bridgewall 17. The protective wall 22 is also constructed so as to bow inwardly toward the hearth of the furnace and is laid directly against the bridgewall 17.

With the type of construction disclosed herein, the bridgewall may be repaired or replaced without fear of the hearth bricks or refractory lining falling into the uptakes of the furnace since the protective wall will prevent any failure of the vertical portions of the hearth end.

Although we have shown the invention related to an open-hearth furnace having a semi-inverted arch type hearth, it is within the scope of this invention to include metallurgical furnaces utilizing the various well known forms of hearths.

We claim:

1. In an open-hearth furnace having side walls, end walls, charging wall and back wall, a hearth pan with horizontal projections, a hearth having vertical end portions, a bridgewall adjacent each of said vertical end portions, uptake passages at each end of said furnace between the said bridgewall and end walls of said furnace, the combination with a protective means interposed between the said bridgewall and said vertical end portion of said hearth, of support means fastened to said horizontal projections of said hearth pan to support said protective means.

2. An open-hearth furnace as claimed in claim 1, in which the protective means is a basic refractory brick wall.

3. An open-hearth furnace as claimed in claim 1, in which the support means is a metal plate fastened to said horizontal projection of said hearth pan of said furnace.

4. An open-hearth furnace as claimed in claim 1, in which the protective means is a basic refractory brick wall, bowed inwardly toward said vertical portion of said hearth of said furnace.

References Cited by the Examiner
UNITED STATES PATENTS
1,106,725   8/1914   MacCallum _____ 110—1 X FREDERICK L. MATTESON, Jr., *Primary Examiner.*
JOHN J. CAMBY, *Examiner.*